US009778109B2

(12) United States Patent
Park et al.

(10) Patent No.: US 9,778,109 B2
(45) Date of Patent: Oct. 3, 2017

(54) METHOD FOR OBTAINING FULL REFLECTANCE SPECTRUM OF A SURFACE AND APPARATUS THEREFOR

(71) Applicant: INDUSTRY-UNIVERSITY COOPERATION FOUNDATION HANYANG UNIVERSITY, Seoul (KR)

(72) Inventors: Jong-Il Park, Seoul (KR); Moon-Hyun Lee, Seoul (KR); Byung-Kuk Seo, Seoul (KR)

(73) Assignee: INDUSTRY-UNUIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 143 days.

(21) Appl. No.: 14/894,302

(22) PCT Filed: May 12, 2014

(86) PCT No.: PCT/KR2014/004221
§ 371 (c)(1),
(2) Date: Nov. 25, 2015

(87) PCT Pub. No.: WO2014/193099
PCT Pub. Date: Dec. 4, 2014

(65) Prior Publication Data
US 2016/0109292 A1 Apr. 21, 2016

(30) Foreign Application Priority Data
May 28, 2013 (KR) .................. 10-2013-0060424

(51) Int. Cl.
*G01J 3/00* (2006.01)
*G01J 3/28* (2006.01)
(Continued)

(52) U.S. Cl.
CPC .......... *G01J 3/2823* (2013.01); *G01J 3/0275* (2013.01); *G01J 3/10* (2013.01); *G01J 3/12* (2013.01);
(Continued)

(58) Field of Classification Search
CPC .......... G01J 3/2823; G01J 3/0275; G01J 3/12; G01J 3/10; G01J 3/2803; G01J 2003/2806; G03B 43/00; H04N 5/228; G06K 9/00

See application file for complete search history.

(56) References Cited

U.S. PATENT DOCUMENTS

2003/0185438 A1* 10/2003 Osawa ............... H04N 1/60
382/162
2010/0073504 A1* 3/2010 Park .................... G06K 9/2018
348/222.1
(Continued)

FOREIGN PATENT DOCUMENTS

JP 11-096333 A 4/1999
JP 2001-311666 A 11/2001
KR 10-1031932 B1 4/2011

OTHER PUBLICATIONS

International Search Report for PCT/KR2014/004221 filed May 12, 2014.

*Primary Examiner* — Jamil Ahmed (57) ABSTRACT

Disclosed are a method for obtaining a full reflectance spectrum of a surface and an apparatus therefor. The method for obtaining a full reflectance spectrum of a surface, comprises the steps of: (a) calculating a combination value of spectral characteristics of a light source and response characteristics of a camera for an image of a reference object, the full reflectance spectrum of a surface of which is known, by utilizing the known full reflectance spectrum of a surface; (b) obtaining an image by photographing an object irradiated
(Continued)

with light according to a predetermined lighting environment; and (c) obtaining a full reflectance spectrum of a surface for the object by utilizing the combination value of the spectral characteristics of the light source and the response characteristics of the camera for the image.

11 Claims, 3 Drawing Sheets

(51) Int. Cl.
    *G01J 3/02*     (2006.01)
    *G01J 3/10*     (2006.01)
    *G03B 43/00*     (2006.01)
    *G01J 3/12*     (2006.01)

(52) U.S. Cl.
    CPC ............ *G01J 3/2803* (2013.01); *G03B 43/00* (2013.01); *G01J 2003/2806* (2013.01)

(56) References Cited

U.S. PATENT DOCUMENTS

| | | |
|---|---|---|
| 2011/0176029 A1 | 7/2011 | Boydston et al. |
| 2012/0082374 A1 | 4/2012 | Agarwal et al. |

\* cited by examiner

METHOD FOR OBTAINING FULL REFLECTANCE SPECTRUM OF A SURFACE AND APPARATUS THEREFOR

CROSS-REFERENCE TO RELATED APPLICATIONS

This application is a National Phase Application of PCT International Application No. PCT/KR2014/004221, which was filed on May 12, 2014, and which claims priority from Korean Patent Application No. 10-2013-0060424, filed with the Korean Intellectual Property Office on May 28, 2013. The disclosures of the above patent applications are incorporated herein by reference in their entirety.

BACKGROUND OF THE INVENTION

1. Technical Field

The present invention relates to a full reflectance spectrum of a surface obtainment method and an apparatus therefor with which a full reflectance spectrum of a surface can be obtained even when the spectral characteristic of the light source and the response characteristic of the camera are unknown.

2. Description of the Related Art

Generally, obtaining a full reflectance spectrum of a surface requires knowing the spectral characteristic of the light source and the response characteristic of the camera. Here, the spectral characteristic of the light source can be easily measured, for example by using a measurement equipment such as a spectroradiometer. In another example, the spectral characteristic of the light source may be indirectly measured if the reflection spectrum and the camera's response characteristic are known, but if the various known reflection spectra are not sufficient, it may be difficult to guarantee the accuracy of the outcome.

In the case of the camera's response characteristic, there is no method of direct measurement, and the response characteristic may be measured by using a large number of narrow band light sources or color filters or by using a reflection spectrum and a light source with known characteristics. With this method, however, it can be difficult to perform the measurement even in a well controlled environment, due to its sensitivity to external light sources, and it can also be difficult to provide accurate measurements, because some of the results may require interpolation if the light sources or filters either are not sufficiently narrow or are not continuous.

In particular, the response characteristic of a camera may also vary according to the type of the lens, due to the deterioration of the sensors, and according to temperature. As frequent re-measurements are inevitable according to various circumstances, there is no actual value that can serve as a standard, making it impossible to verify the results.

SUMMARY OF THE INVENTION

An aspect of the invention is to provide a full reflectance spectrum of a surface obtainment method and an apparatus therefor with which a full reflectance spectrum of a surface can be obtained even when the spectral characteristic of the light source and the response characteristic of the camera are unknown.

One aspect of the invention provides a method with which a full reflectance spectrum of a surface can be obtained even when the spectral characteristic of the light source and the response characteristic of the camera are unknown.

An embodiment of the invention can provide a full reflectance spectrum of a surface obtainment method that includes: (a) calculating a light source spectrum characteristic and camera response characteristic combination value from a photographed image of a reference object having a known full reflectance spectrum of a surface by using the known full reflectance spectrum of a surface; (b) obtaining an image by photographing an object irradiated with light according to a predetermined lighting environment; and (c) obtaining a full reflectance spectrum of a surface for the object by using the light source spectrum characteristic and camera response characteristic combination value.

The light source spectrum characteristic and camera response characteristic combination value may be the result of multiplying a camera response characteristic value and a spectrum characteristic value of a light source.

Step (a) may include: calculating a weight for a known basis function for the known full reflectance spectrum of a surface by using the known full reflectance spectrum of a surface and the known basis function; and obtaining the light source spectrum characteristic and camera response characteristic combination value by using the weight for the known basis function.

The weight for the basis function may be calculated by using the equation shown below:

$$\sigma_k = \int s(\lambda) b_k(\lambda) d\lambda, \text{ for } k=1, \ldots, K_s$$

where $K_s$ is the number of basis functions, $s(\lambda)$ represents the full reflectance spectrum of a surface of the object, and $b_k(\lambda)$ represents a basis function of the full reflectance spectrum of a surface of the object.

The camera conditions for the camera photographing the image and the lighting conditions may be the same in step (a) and step (b), and the camera conditions may entail the same camera and lens.

Another embodiment of the invention can provide a method of obtaining images in a calibration apparatus that includes an image obtainment unit, in which a lighting device and a camera are mounted, and a calibration unit, in which a reference object with a known full reflectance spectrum of a surface is mounted, where the method can include: closing off the inside of the calibration unit where the reference object is adhered by coupling the image obtainment unit with the calibration unit; and obtaining a multiple number of images of the reference object by altering the lighting device.

The multiple number of images can be used to calculate a light source spectrum characteristic and camera response characteristic combination value, an image of a target object can be obtained using the camera of the image obtainment unit while the calibration unit is in a detached state, and a full reflectance spectrum of a surface of the target object can be computed by using the image of the target object and the light source spectrum characteristic and camera response characteristic combination value.

Another aspect of the invention provides an apparatus with which a full reflectance spectrum of a surface can be obtained even when the spectral characteristic of the light source and the response characteristic of the camera are unknown.

An embodiment of the invention can provide a calibration apparatus for obtaining a full reflectance spectrum of a surface that includes: an image obtainment unit, in which a lighting device and a camera are mounted; and a calibration unit, in which an insertion hole is formed for inserting the image obtainment unit, and in which a reference-object securing unit is provided that has a reference object with a known full reflectance spectrum of a surface secured thereto, where the calibration unit can be closed at all sides when the image obtainment unit is inserted, and the image obtainment unit can obtain multiple images with at least one of the illuminance and the color of the lighting device changed.

The reference-object securing unit may be attachable and detachable with respect to the calibration unit.

The multiple number of images obtained at the image obtainment unit can be used to calculate a light source spectrum characteristic and camera response characteristic combination value.

By providing a full reflectance spectrum of a surface obtainment method and an apparatus therefor according to an embodiment of the invention, a full reflectance spectrum of a surface can be obtained even when the spectral characteristic of the light source and the response characteristic of the camera are unknown.

Because of this, an embodiment of the invention can effectively and accurately obtain a full reflectance spectrum of a surface by photographing multiple objects with known reflection spectra in a given lighting environment and using the information thus obtained.

DETAILED DESCRIPTION OF THE INVENTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

The present invention relates to obtaining a full reflectance spectrum of a surface when the spectrum characteristic of the light source and the response characteristic of the camera are unknown. The invention entails photographing several objects in a given lighting environment where the full reflection spectra of the objects are known, using the known full reflection spectra to derive the combined result of the spectrum characteristic of the light source and the response characteristic of the camera, and then using this to obtain the full reflectance spectrum of a surface for another object. Certain embodiments of the invention are described below in more detail with reference to the accompanying drawings.

Figure 1:
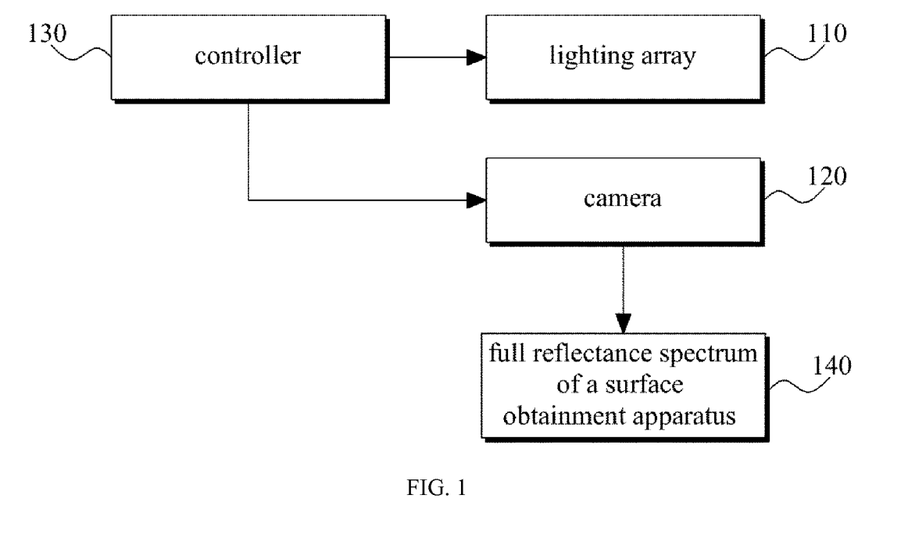
FIG. 1 is a block diagram schematically illustrating the composition of a system for obtaining a full reflectance spectrum of a surface according to an embodiment of the invention.

FIG. 1 is a block diagram schematically illustrating the composition of a system for obtaining a full reflectance spectrum of a surface according to an embodiment of the invention.

Referring to FIG. 1, a system 100 for obtaining a full reflectance spectrum of a surface according to an embodiment of the invention may include a lighting array 110, a camera 120, a controller 130, and a full reflectance spectrum of a surface obtainment apparatus 140. In FIG. 1, it is supposed that the full reflectance spectrum of a surface obtainment apparatus 140 is included in the system as a separate and individual independent component, but the full reflectance spectrum of a surface obtainment apparatus 140 can also be included as a signal processing module serving as a component in the camera 120.

The lighting array 110 may include an n (natural number) number of light sources. The lighting array 110 can irradiate light onto a target object in a desired lighting environment by deciding which of the n light sources to turn on or off according to the control from the controller 130.

The camera 120 may be a means for obtaining images by photographing a target object. For example, the camera 120 can obtain an image by photograph a target object onto which light is irradiated according to a particular lighting environment that is provided according to the control of the controller 130. Here, the camera 120 can be a typical camera for photographing RGB images.

The controller 130 may be a means for controlling the lighting array 110 and the camera 120.

For example, the controller 130 can output a control signal to the lighting array 110, with the control signal indicating on or off patterns for the respective light sources included in the lighting array 110, so that the lighting array 110 can irradiate light onto the target object according to a particular lighting environment. Correspondingly, the lighting array 110 can determine the on or off patterns of the light sources according to the control signal of the controller 130 and can irradiate light onto the target object to be suitable for the particular lighting environment.

Also, the controller 130 can control the camera 120 such that, after light is irradiated via the lighting array 110 onto the target object, the camera 120 photographs a multiple number of target objects to obtain images. Here, there can be a single camera 120 or a multiple number of cameras 120. Accordingly, the controller 130 can output synchronized control signals to the camera 120, and the camera 120 can obtain images by photographing a multiple number of target objects in accordance with the synchronized control signals of the controller 130.

The full reflectance spectrum of a surface obtainment apparatus 140 may be a means for obtaining a full reflectance spectrum of a surface for a target object.

Generally, a photographed image can be represented by using the full reflectance spectrum of a surface of the object, camera response characteristic, and light source spectrum characteristic. This can be expressed mathematically as Equation 1 shown below.

$$I = \int s(\lambda) c_m(\lambda) p_n(\lambda) d\lambda.$$

Here, $s(\lambda)$ represents the full reflectance spectrum of a surface, $c_n(\lambda)$ represents the camera response characteristic, and $p_n(\lambda)$ represents the light source spectrum characteristic.

If the camera response characteristic and light source spectrum characteristic can be found for a photographed image, the full reflectance spectrum of a surface for an object can be obtained by using Equation 1 above.

However, finding the camera response characteristic and the light source spectrum characteristic individually can be difficult, and measurements may yield highly inaccurate results.

Therefore, a full reflectance spectrum of a surface obtainment apparatus 140 according to an embodiment of the invention can photograph a reference object of which the full reflectance spectrum of a surface is known, calculate a combination value of the combined effect of the camera response characteristic and the light source spectrum characteristic, and then use the combination value to obtain a full reflectance spectrum of a surface for an image taken of another photographed object. Here, the combination value of the camera response characteristic and light source spectrum characteristic may be a product of multiplying the camera response characteristic with the light source spectrum characteristic.

That is, the full reflectance spectrum of a surface obtainment apparatus 140 can photograph a reference object of which the full reflectance spectrum of a surface is known, use the known full reflectance spectrum of a surface to first calculate the camera response characteristic, the light source's spectrum characteristic, and the variables forming a coefficient for the basis function, and then use these to obtain the full reflectance spectrum of a surface for another target object of which the full reflectance spectrum of a surface is not known.

In Equation 1, the full reflectance spectrum of a surface $s(\lambda)$ can be represented as the sum of multiple numbers of spectrum basis functions $b_k(\lambda)$ and weights $\sigma_k$. This can be expressed as Equation 2 below.

$$s(\lambda) = \sum_{k=1}^{K_s} \sigma_k b_k(\lambda)$$

Here, $K_s$ represents the number of basis functions.

According to an embodiment of the invention, a basis function for the full reflectance spectrum of a surface can be composed by finding the eigenvectors of the correlation matrix from the reflection spectra of 1,257 Munsell color chips. As this is known to those skilled in the art, it will not be described here in further detail.

By substituting the full reflectance spectrum of a surface equation expressed as Equation 2 into Equation 1, Equation 1 can be expressed as Equation 3 shown below.

$$I = \sum_{k=1}^{K_s} \sigma_k \int b_k(\lambda) c_m(\lambda) p_n(\lambda) d\lambda$$

As can be seen from Equations 1 to 3, the full reflectance spectrum of a surface can be obtained by determining a light source spectrum characteristic and camera response characteristic combination value. In obtaining the full reflectance spectrum of a surface of an image, it can be difficult to measure the response characteristic of the camera and the spectrum characteristic of the light source individually. However, the full reflectance spectrum of a surface for each object can be obtained relatively easily, compared to other characteristics, by using a spectroradiometer, etc.

Therefore, in obtaining the full reflectance spectrum of a surface, the resultant values of the remaining required variables other than the full reflectance spectrum of a surface in the form of a coefficient can first be obtained, after which these resultant values can be used to obtain the full reflectance spectrum of a surface for another object.

This can be expressed as Equation 4 shown below.

$$f_{mnk} = \int c_m(\lambda) p_n(\lambda) b_k(\lambda) d\lambda.$$

The resultant values of the remaining variables other than the full reflectance spectrum of a surface, calculated in the form of a coefficient for obtaining the full reflectance spectrum of a surface as in Equation 4, can be substituted into Equation 3, whereby Equation 3 can be expressed in the form of a matrix equation as Equation 5 shown below.

$$F\sigma = I$$

If it is supposed in Equation 5 that the full reflectance spectrum of a surface of an object is known, then due to the orthogonality between the basis function $b_k(\lambda)$ and the full reflectance spectrum of a surface $s(\lambda)$, the weight $\sigma_k$ for the basis function of a target object can be expressed as Equation 6 shown below.

$$\sigma_k = \int s(\lambda) b_k(\lambda) d\lambda, \text{ for } k=1, \ldots, K_s$$

Thus, the full reflectance spectrum of a surface obtainment apparatus 140 can use the known full reflectance spectrum of a surface of an object to calculate the weight for the basis function of the full reflectance spectrum of a surface of the object. Then, the full reflectance spectrum of a surface obtainment apparatus can derive the weights $\sigma_k$ of an R number of basis functions to calculate the light source spectrum characteristic and camera response characteristic combination value.

For example, if the weights $\sigma_k$ of R basis functions are known, then Equation 3 can be expressed as Equation 7 shown below.

$$\begin{bmatrix} I_{mn,1} \\ \vdots \\ I_{mn,R} \end{bmatrix} = \begin{bmatrix} \sigma_{1,1} & \cdots & \sigma_{1,K_s} \\ \vdots & \ddots & \vdots \\ \sigma_{R,1} & \cdots & \sigma_{R,K_s} \end{bmatrix} \begin{bmatrix} f_{mn,1} \\ \vdots \\ f_{mn,K_s} \end{bmatrix}$$

Here, n (=1, ..., N) represents each light source, m (=1, ..., M) represents each camera, R represents the number of objects of which the full reflection spectra are known, and $K_s$ represents the number of basis functions.

Accordingly, if the number of reflection spectra of objects R is greater than the number of light sources N and the number of channels of the camera M, then the above can be used to derive the light source spectrum characteristic and camera response characteristic combination value. This light source spectrum characteristic and camera response characteristic combination value represents values that are fixed as long as neither the camera and lens nor the light sources are changed.

Thus, the full reflectance spectrum of a surface obtainment apparatus 140 can find the resultant values for the remaining variables other than the full reflectance spectrum of a surface in the form of a coefficient (e.g. the light source spectrum characteristic and camera response characteristic combination value) by using several objects of which the full reflection spectra are known, without measuring the spectrum characteristic of the light source and the response characteristic of the camera individually, to obtain the full reflectance spectrum of a surface of a target object.

Figure 2:
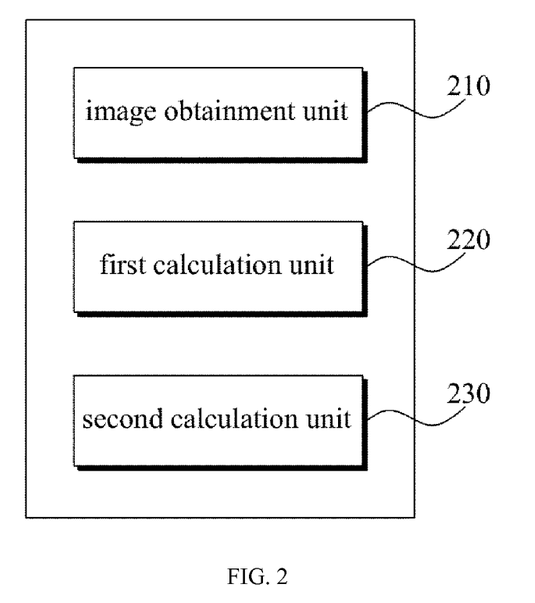
FIG. 2 is a block diagram illustrating the composition of a full reflectance spectrum of a surface obtainment apparatus according to an embodiment of the invention.

FIG. 2 is a block diagram illustrating the composition of a full reflectance spectrum of a surface obtainment apparatus according to an embodiment of the invention.

Referring to FIG. 2, a full reflectance spectrum of a surface obtainment apparatus 140 according to an embodiment of the invention may include an image obtainment unit 210, a first calculation unit 220, and a second calculation unit 230.

The image obtainment unit 210 may be a means for obtaining or receiving an image of a photographed object.

The first calculation unit 220 may be a means for calculating the light source spectrum characteristic and camera response characteristic combination value for a test image obtained via the image obtainment unit 210, by using a known full reflectance spectrum of a surface.

The method of calculating the light source spectrum characteristic and camera response characteristic combination value may be the same as that described above with reference to FIG. 1 and thus will not be described here in further detail.

The second calculation unit 230 may serve to calculate the full reflectance spectrum of a surface for a target object by using the light source spectrum characteristic and camera response characteristic combination value calculated by the first calculation unit 220. The method of calculating the full reflectance spectrum of a surface for the target object by using the light source spectrum characteristic and camera response characteristic combination value in the photographed image of the target object the same as that described above with reference to FIG. 1 and thus will not be described here in further detail.

Figure 3:
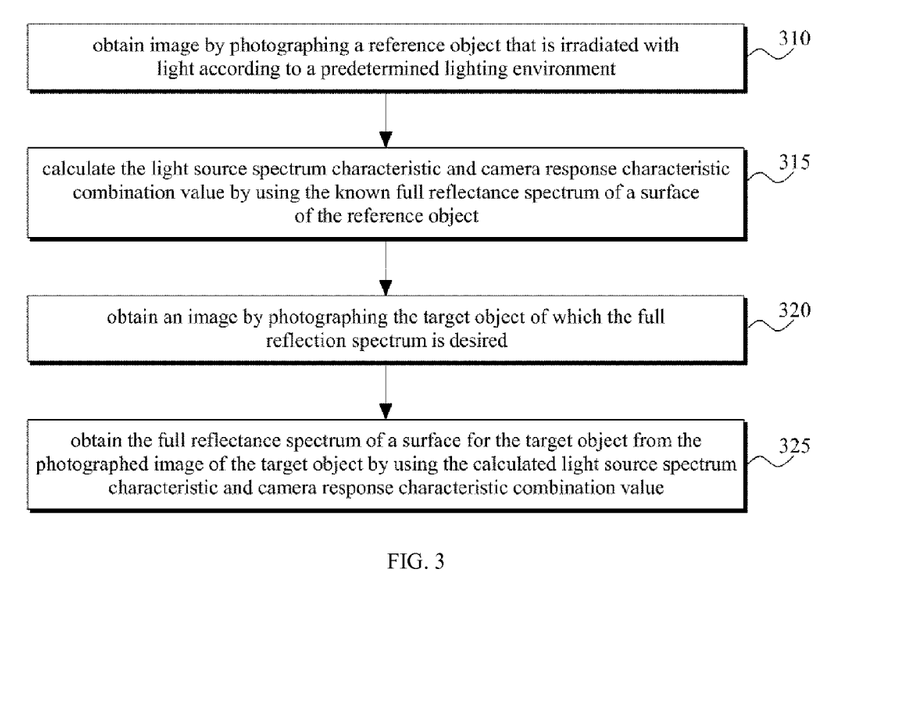
FIG. 3 is a flowchart illustrating a method for obtaining a full reflectance spectrum of a surface according to an embodiment of the invention.

FIG. 3 is a flowchart illustrating a method for obtaining a full reflectance spectrum of a surface according to an embodiment of the invention. The full reflectance spectrum of a surface obtainment apparatus described as follows can be a camera or can be a separate component independent of a camera.

In operation 310, the full reflectance spectrum of a surface obtainment apparatus may obtain an image by photographing a reference object that is irradiated with light according to a predetermined lighting environment. Here, the reference object represents an object of which the full reflectance spectrum of a surface is known. In another example, the full reflectance spectrum of a surface for the reference object can also be measured separately by using a spectroradiometer.

In operation 315, the full reflectance spectrum of a surface obtainment apparatus may calculate the light source spectrum characteristic and camera response characteristic combination value by using the known full reflectance spectrum of a surface of the reference object. As already described above, the light source spectrum characteristic and camera response characteristic combination value can be a product of multiplying the light source spectrum characteristic and the camera response characteristic.

For example, the full reflectance spectrum of a surface obtainment apparatus can calculate the basis function for the full reflectance spectrum of a surface by using known basis functions for objects with known full reflection spectra. As described above, the basis function for the full reflectance spectrum of a surface can be composed by finding the eigenvectors of the correlation matrix from the reflection spectra of 1,257 Munsell color chips.

When the weights for the basis functions for the full reflection spectra are calculated, the full reflectance spectrum of a surface obtainment apparatus can use the weights of the basis functions to calculate the light source spectrum characteristic and camera response characteristic combination value. For example, the full reflectance spectrum of a surface obtainment apparatus 100 can calculate the light source spectrum characteristic and camera response characteristic combination value by substituting the weights for the basis functions for the full reflection spectra of objects into Equation 7.

In operation 320, the full reflectance spectrum of a surface obtainment apparatus may obtain an image by photographing the target object of which the full reflectance spectrum of a surface is desired.

In operation 325, the full reflectance spectrum of a surface obtainment apparatus may obtain the full reflectance spectrum of a surface for the target object from the photographed image of the target object by using the calculated light source spectrum characteristic and camera response characteristic combination value.

Figure 4:
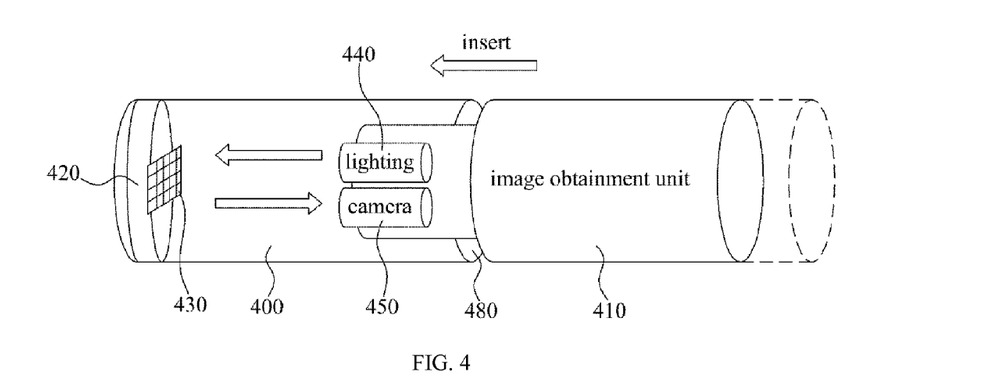
FIG. 4 illustrates the external structure of a calibration apparatus for obtaining a full reflectance spectrum of a surface according to an embodiment of the invention.

FIG. 4 illustrates the external structure of a calibration apparatus for obtaining a full reflectance spectrum of a surface according to an embodiment of the invention.

Referring to FIG. 4, the calibration apparatus for obtaining a full reflectance spectrum of a surface according to an embodiment of the invention may include a calibration unit 400 and an image obtainment unit 410.

The calibration unit 400 may serve to perform calibration for obtaining the light source spectrum characteristic and camera response characteristic combination value, and the image obtainment unit 410 may serve to obtain the images needed for later computing the light source spectrum characteristic and camera response characteristic combination value and the full reflectance spectrum of a surface.

An insertion hole 480 may be formed in the calibration unit 400, and the image obtainment unit 410 may be inserted into the calibration unit 400 through the insertion hole 480.

At the end portion of the image obtainment unit 410 that is inserted into the calibration unit 400, a lighting device 440 and a camera 450 may be coupled.

A hollow space may be formed in the calibration unit 400, and when the image obtainment unit 410 is coupled, the inside of the calibration unit 400 may be put in a state analogous to a dark room. A reference-object securing unit 420 may be provided at the opposite side of the insertion hole 480, and a reference object 430 may be secured to the reference-object securing unit 420. Here, a reference object 430 refers to an object of which the full reflectance spectrum of a surface is known, and a color chart, for example, can be included for the reference object.

The calibration unit 400 may preferably have a structure that allows the reference-object securing unit 420 to be inserted and be attachable and detachable. With such a structure, it would be possible to exchange the reference object as needed.

While the image obtainment unit 410 is inserted within the calibration unit 400, the camera 450 may obtain an image of the reference object 430, and the lighting device 440 may provide lighting for obtaining the image. Since multiple images may be obtained for obtaining the light source spectrum characteristic and camera response characteristic combination value, it may be preferable for the lighting device 440 to provide various types of lighting with different illuminance levels or colors.

Although FIG. 4 illustrates the lighting device 440 and the camera 450 as being coupled to a distal end of the image obtainment unit 410 and exposed, it should be apparent to those skilled in the art that the lighting device 440 and the camera 450 can also be embedded inside the image obtainment unit 410, with cables that join thereto exposed outside the image obtainment unit 410 to obtain the images and provide lighting.

In one example, several lamps with different illuminances and colors can be included in the lighting device 440. In other examples, several lighting devices 440 can also include a separate controller that allows adjustments to the illuminance or color.

The camera may obtain several images under various lighting conditions, after which the light source spectrum characteristic and camera response characteristic combination value may be obtained by using the images obtained at the image obtainment unit 410 and the known full reflectance spectrum of a surface of the reference object 430. The light source spectrum characteristic and camera response characteristic combination value can be computed directly at the image obtainment unit 410 and can also be computed using a different computing device.

The light source spectrum characteristic and camera response characteristic combination value thus obtained can be used to obtain the full reflectance spectrum of a surface for the target object.

FIG. 4 is described above focusing on an example in which the environment for measuring the spectrum reflection characteristic is an environment that has no lighting (e.g. in a dark room state). In another example, when the full reflectance spectrum of a surface for the target object is desired in a normal lighting environment, a difference image can be derived between an image photographed while applying the lighting of the calibration apparatus to the target object and an image photographed with the lighting turned off, and the full reflectance spectrum of a surface for the target object can be found by using the difference image thus derived and the light source spectrum characteristic and camera response characteristic combination value derived previously. That is, in the case of a normal lighting environment, a difference image between an image photographed with the lighting of the calibration apparatus applied on the target object and an image photographed with the lighting turned off can be derived, so that the light source spectrum characteristic and camera response characteristic combination value, which was derived previously with ambient light removed, can be used to provide the full reflectance spectrum of a surface for the target object. Here, the previously derived light source spectrum characteristic and camera response characteristic combination value may be a value that is obtained using several images which were obtained with lighting provided to the reference object 430 in a dark room state (i.e. while the calibration unit 400 is inserted in the calibration apparatus).

For example, suppose that the full reflectance spectrum of a surface for a target object is to be derived based on the light source spectrum characteristic and camera response characteristic combination value derived using images obtained with lighting provided onto the reference object 430 from two lighting devices. Here, suppose that the light source spectrum characteristic and camera response characteristic combination value was calculated using the images obtained by applying lighting on the reference object 430 in a dark room state. The calibration apparatus can obtain a first image in which there is no lighting applied on the target object for which the full reflectance spectrum of a surface is desired, obtain a second image in which a first lighting is applied by the calibration apparatus, and obtain a third image in which a second lighting is applied by the calibration apparatus.

The calibration apparatus can acquire a difference image (hereinafter referred to as the first difference image) between the first image and the second image to remove the ambient light, and can acquire a difference image (hereinafter referred to as the second difference image) between the first image and the third image to remove the ambient light. Then, the calibration apparatus can find the full reflectance spectrum of a surface for the target object by using the first difference image, the second difference image, and the light source spectrum characteristic and camera response characteristic combination value derived previously in a dark room state. In this way, in a normal lighting environment in which ambient light is present, the ambient light can be removed by acquiring a difference image between an image obtained with the lighting device of the calibration apparatus turned off and an image obtained with the lighting device of the calibration apparatus turned on, thereby providing the same effect as obtaining an image of the target object in a dark room state.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A full reflectance spectrum of a surface obtainment method comprising:
   (a) calculating a light source spectrum characteristic and camera response characteristic combination value from a photographed image of a reference object having a known full reflectance spectrum of a surface by using the known full reflectance spectrum of a surface;
   (b) obtaining an image by photographing an object irradiated with light according to a predetermined lighting environment; and
   (c) obtaining a full reflectance spectrum of a surface for the object by using the light source spectrum characteristic and camera response characteristic combination value.

2. The full reflectance spectrum of a surface obtainment method of claim 1, wherein the light source spectrum characteristic and camera response characteristic combination value is a result of multiplying a camera response characteristic value and a spectrum characteristic value of a light source.

3. The full reflectance spectrum of a surface obtainment method of claim 1, wherein said step (a) comprises:
   calculating a weight for a known basis function for the known full reflectance spectrum of a surface by using the known full reflectance spectrum of a surface and the known basis function; and
   obtaining the light source spectrum characteristic and camera response characteristic combination value by using the weight for the known basis function.

4. The full reflectance spectrum of a surface obtainment method of claim 3, wherein the weight for the basis function is calculated by using an equation shown below:

$$\sigma_k = \int s(\lambda) b_k(\lambda) d\lambda, \text{ for } k=1,\ldots,K_s$$

where $K_s$ is a number of basis functions, $s(\lambda)$ represents the full reflectance spectrum of a surface of the object, and $b_k(\lambda)$ represents a basis function of the full reflectance spectrum of a surface of the object.

5. The full reflectance spectrum of a surface obtainment method of claim 1, wherein camera conditions for a camera photographing the image and lighting conditions are the same in said step (a) and said step (b), and the camera conditions entail the same camera and lens.

6. A calibration apparatus for obtaining a full reflectance spectrum of a surface, the calibration apparatus comprising:

an image obtainment unit having a lighting device and a camera mounted therein; and a calibration unit having an insertion hole formed therein for inserting the image obtainment unit, the calibration unit having a reference-object securing unit therein, the reference-object securing unit having a reference object with a known full reflectance spectrum of a surface secured thereto, wherein the calibration unit is closed at all sides when the image obtainment unit is inserted, and the image obtainment unit obtains a plurality of images with at least one of an illuminance and a color of the lighting device changed.

7. The calibration apparatus of claim 6, wherein the reference-object securing unit is attachable and detachable with respect to the calibration unit.

8. The calibration apparatus of claim 6, wherein a light source spectrum characteristic and camera response characteristic combination value is calculated using the plurality of images obtained at the image obtainment unit.

9. A method of obtaining images in a calibration apparatus, the calibration apparatus comprising an image obtainment unit having a lighting device and a camera mounted therein and a calibration unit having a reference object with a known full reflectance spectrum of a surface mounted therein, the method comprising:

closing off an inside of the calibration unit where the reference object is adhered by coupling the image obtainment unit with the calibration unit; and obtaining a plurality of images of the reference object by altering the lighting device.

10. The method of claim 9, wherein a light source spectrum characteristic and camera response characteristic combination value is calculated using the plurality of images, and an image of a target object is obtained using the camera of the image obtainment unit while the calibration unit is in a detached state, and a full reflectance spectrum of a surface of the target object is computed by using the image of the target object and the light source spectrum characteristic and camera response characteristic combination value.

11. The method of claim 10, further comprising:

obtaining an image of the target object while the lighting device is off, wherein a difference image is derived between the image obtained of the target object while the lighting device is off and an image obtained of the target object with the lighting device altered, the full reflectance spectrum of a surface of the target object is computed by using the difference image and the light source spectrum characteristic and camera response characteristic combination value.

\* \* \* \* \*